Figure 1:
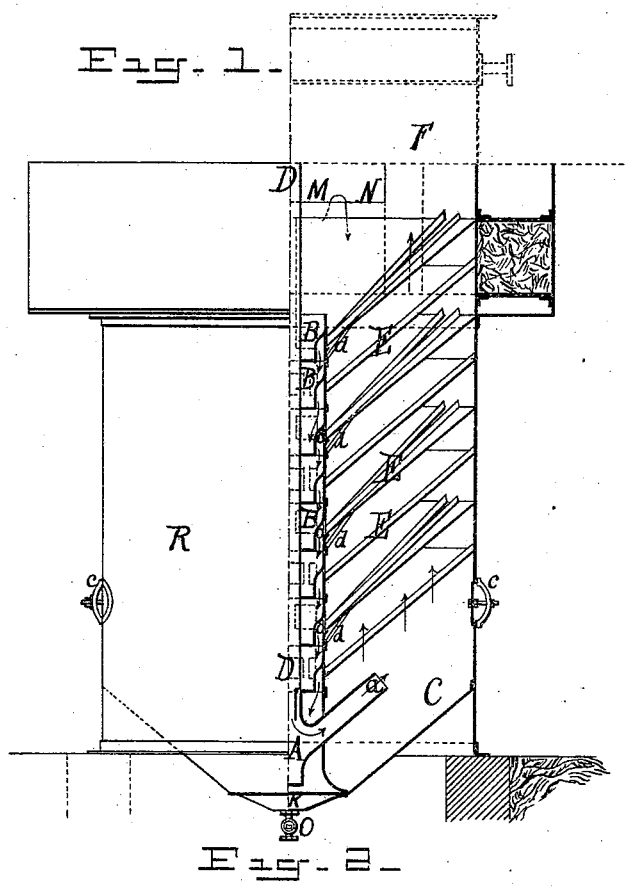

(No Model.)  3 Sheets—Sheet 1.
P. H. A. GAILLET.
FILTER.

No. 459,574. Patented Sept. 15, 1891.

WITNESSES:
John Revell
George Baumann

INVENTOR
Paul H. A. Gaillet
BY Howson and Howson
his ATTORNEYS (No Model.) 3 Sheets—Sheet 2.

P. H. A. GAILLET.
FILTER.

No. 459,574. Patented Sept. 15, 1891.

WITNESSES:
John Revell
George Baumann

INVENTOR
Paul H. A. Gaillet
BY
Howson and Howson
his ATTORNEYS (No Model.)  P. H. A. GAILLET.  3 Sheets—Sheet 3.
FILTER.
No. 459,574.  Patented Sept. 15, 1891.
Fig. 10.  Fig. 11.
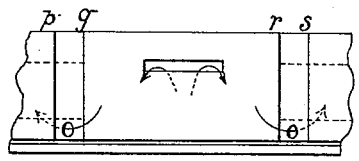
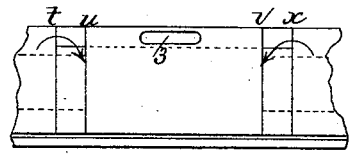
Fig. 6.  Fig. 7.  Fig. 8.  Fig. 9.
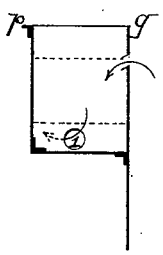
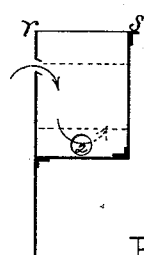
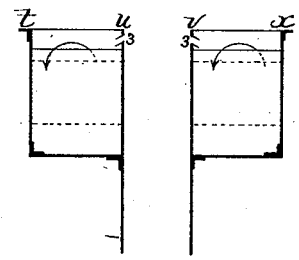
Fig. 12.
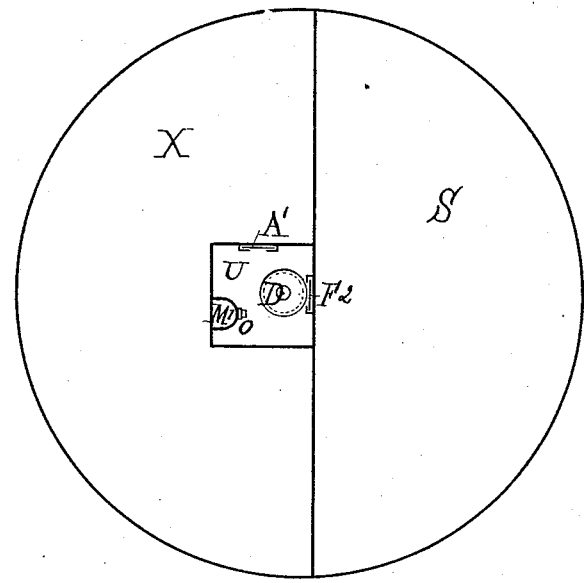
WITNESSES:
John Revell
George Baemann
INVENTOR
Paul H. A. Gaillet
BY
Howson and Howson
his ATTORNEYS

UNITED STATES PATENT OFFICE.

PAUL HENRI AUGUSTE GAILLET, OF LILLE, FRANCE.

FILTER.

SPECIFICATION forming part of Letters Patent No. 459,574, dated September 15, 1891.

Application filed May 22, 1890. Serial No. 352,811. (No model.) Patented in France October 24, 1882, No. 151,693; in Italy August 30, 1884, No. 17,221; in Belgium September 12, 1889, No. 87,710; in Austria-Hungary December 24, 1889, No. 40,674; and in Switzerland February 28, 1890, No. 1,876.

*To all whom it may concern:*

Be it known that I, PAUL HENRI AUGUSTE GAILLET, residing at Lille, (Nord,) in the Republic of France, have invented Improved Apparatus for the Decantation of Liquids, (for which I have obtained Letters Patent in France by patent of addition of June 26, 1889, to the Patent No. 151,693, dated October 24, 1882; in Belgium, Patent No. 87,710, dated September 12, 1889; in Italy by patent of addition, No. 26,196, dated September 23, 1889, to the original patent of No. 17,221, dated August 30, 1884; in Switzerland, Patent No. 1,876, dated February 28, 1890, and in Austria-Hungary, Patent No. 40,674, dated December 24, 1889,) of which the following is a specification.

This invention relates to an improved decanting apparatus to separate the solid matters held in suspension in liquids, but more particularly for the purification of water. This decanting apparatus gives the following results: entire suppression of all tightness of the diaphragms—that is to say, total absence of rivetings—thus reducing the cost of the apparatus to a minimum; permitting simple superposition of the diaphragms or deposit-surfaces, varying in number as required, without rivetings or fastening-bolts, which renders the setting up and taking to pieces as simple as possible; requiring but a single orifice for removal of the deposits and so that they may never be taken up again by the liquid to be clarified; permitting the filter to be placed at will directly above the decanting apparatus or exteriorly. The exterior arrangement of filter permits its isolation without interrupting the work, or its division into two or more parts which may be isolated at will, thereby permitting cleansing without interruption of work.

The principle upon which I base the construction of my improved decanting apparatus is the following: To cause the water to enter at the lower part of the vertically-arranged apparatus hereinafter referred to as the "decanter," and to provide for its ascension, (or its descent if the movement is to be downward,) symmetrical orifices are distributed uniformly in relation to the section of the apparatus, to attain a regular circulation in all parts of the decanter and compel the water to spread uniformly upon all the deposit-surfaces. It suffices that these depositing-surfaces should be so arranged as to obtain the circulation of the liquid in thin sheets and to collect the deposits toward the discharge orifice, and in such wise that these latter may never be again taken up by the liquid to be clarified.

Figure 2:
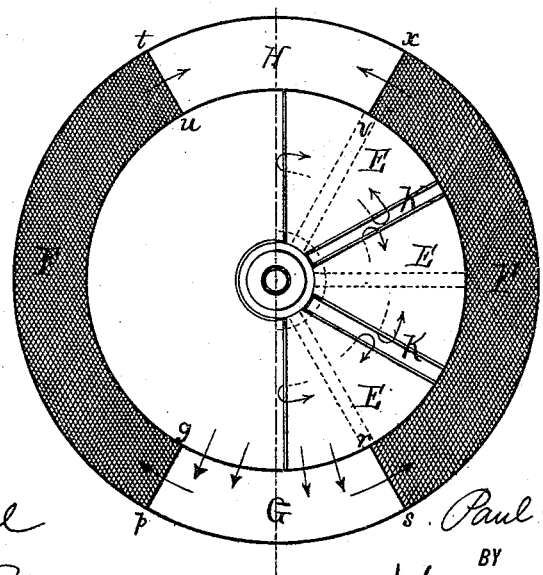
Figure 3:
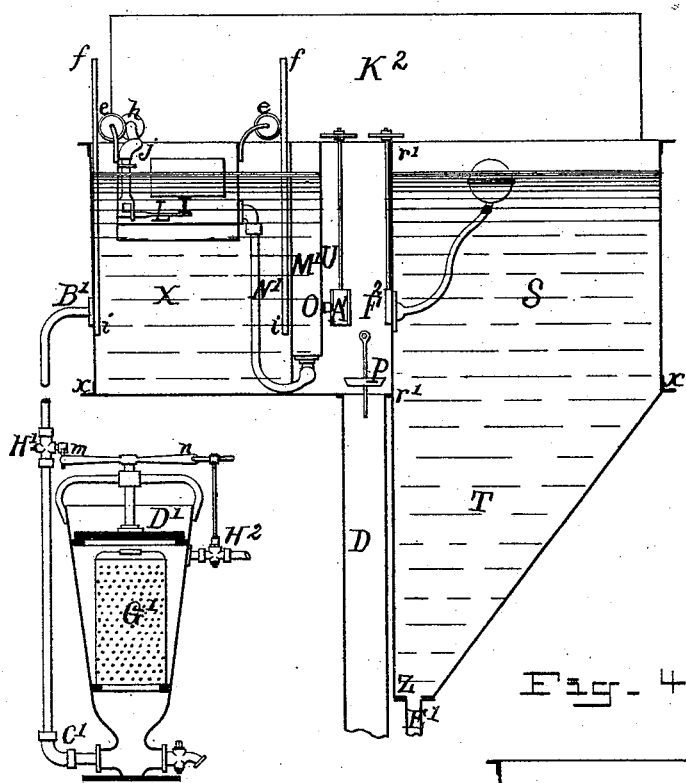
Figure 5:
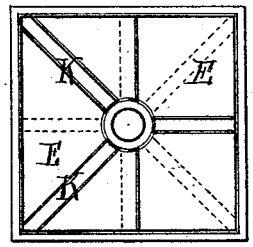
Figure 4:
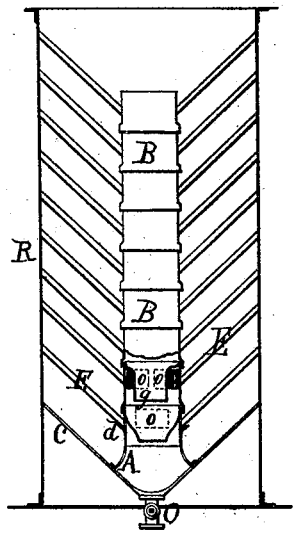

In the accompanying drawings, Figure 1 represents in elevation my decanting apparatus with a cylindrical base. Fig. 2 is a plan of same, the part on the left of the figure representing the half-plan of one stage or floor, and the other part on the right the half-plan of the adjoining stage. Fig. 4 represents, half in elevation, half in vertical section, my decanting apparatus with square base. Fig. 5 is a plan of same. In the right-hand half of this figure the upper part of the apparatus is removed, so that the arrangement of the diaphragms may be seen. Fig. 3 represents the arrangement of the preparer of the reagent directly above my decanting apparatus when the filter is placed exteriorly. Figs. 6 and 7 are views of the inlet ends of the filters. Figs. 8 and 9 are views of the outlet ends thereof. Fig. 10 represents in elevation the filter at the inlet ends, showing the inlet from the decanting apparatus. Fig. 11 is a similar view at the outlet ends. Fig. 12 is a plan of the reagent-preparer with its receiver and floating regulator removed.

My decanting apparatus is composed of a vertical cylindrical receiver R, ending in a conical bottom C, having a movable basin K', provided with a purging or mud cock. Upon the bottom is placed a cast-iron piece A, serving at the same time as support to the central column and as diffuser for spreading the liquid to be clarified in the lower part of the decanting apparatus. With this object the piece A is provided with several pipes cast with or fixed thereto, as follows: an upward extension in the form of a vertical tube or pipe D in the center of the decanter and serving as an inlet to bring the liquid to be clarified; an extension downward toward the bottom of the decanter to permit the cleaning of the central tube and the drawing off at the bottom of the deposits which may form there. Other pipes *a*, directed at an angle equal to that of the diaphragms hereinafter referred to, are intended to conduct the liquid into the bottom of the decanter. The liquid may also be made to issue below a sort of covering piece or mantle, which diverts it from the center. I would observe that in every case the diffusing-organs must be constructed so as to avoid accumulation above them of the deposits descending from the upper stages. Above the piece A are fitted circular pieces B, pierced with orifices *o*, symmetrically arranged, and covered by a piece *g*, cast with it, the effect of which is to direct the deposits toward the base to withdraw them from the action of any ascensional current which might accidentally be established in the central tube, and to insure the purging or draining of each stage independently of that of the others. All the pieces B have a flange *d*, upon which the deposit-surfaces E rest, and the holes *o* therein are so pierced that they face the solid parts of these surfaces, which solid parts are alternated from one stage to another. The deposit-surfaces are constituted by portions of cones all alike E, or by plane triangles with turned-up edges cut precisely and following the generatrices of the cones; but preferably so as to preserve to the trenches or conduits K, which serve for the passage of the liquid, a constant breadth from the center to the periphery in such a manner that the liquid may rise uniformly in all the trenches and in their entire extent.

The circulation of the liquid to be clarified is effected in the following manner: The liquid to be clarified, entering at the lower part of the decanter, either by an outer piping or by the central tube D, concentric to that which serves for the fall of the deposits, rises in the apparatus through symmetrical orifices K, of dimension relatively considerable with reference to the section of the pipe bringing it, and after having passed through them it meets the solid parts of the upper diaphragm, which compel it to circulate above the deposit-surfaces of the diaphragm traversed, and then to rise by the orifices of the diaphragm situated immediately above. The movement of the liquid is thus opposed without abrupt changes, and the circulation above the diaphragms thus takes place in thin sheets—all circumstances favorable to the decantation. The deposits which form upon the diaphragm slide naturally upon them without dirtying or fouling the liquid which rises, and they come regularly and continually, pouring into the central tube, which conducts them into the bottom of the decanter, from which they may be discharged by the purging-orifice O. The sheaths *g* which cover the orifices have for their object to prevent any ascension of the liquid by this central tube and through the orifices with which it is provided.

Orifices *c* with self-closing apparatus are arranged, as shown in Fig. 1, to allow the tubes *a*, which distribute the liquid to be clarified, to be inspected or cleaned. Similar orifices may be placed at each stage, but would not be useful, inasmuch that by this construction, which comprises neither tight joints nor pieces bolted together nor rivetings, the apparatus may be taken to pieces under the most favorable conditions.

My decanting apparatus is terminated by a filter F, placed directly above or exteriorly. The use of the exterior filter does not require an increase in the height of the decanter equal to the height of the filter, and it permits dividing the filter into two or more parts, which may be isolated at will, and therefore be cleaned without interruption of the work. It further permits suppressing at will the action of the filter and seeing the liquid before the filtration to verify the decantation. The exterior filter F is formed, Fig. 2, by a circular piece or crown concentric with the side or wall of the decanter and divided into two compartments G and H. The water decanted issues from the decanter by a sloping cut M N, and falls into the tank or receptacle G. It then passes beneath the partitions or divisions *p q r s* to spread beneath the filters F F, which it traverses from bottom to top. The filtered water passes above the partitions *t u v x* to fall into the tank or receptacle H, which serves as a reserve of purified and filtered water, if a clarification of water is in question, as is generally the case when the filter is used. The gratings of the filter are annular and set upon two angle-pieces suitably arranged. Between the lower and the upper grating is piled the filtering material, which may be of any kind—wood, sand, sponges, charcoal, gravel, coke, &c. The two gratings being movable, it is easy to clean the bottom of the filter, which, in the case of the outer filter, is not necessarily provided with cleaning-orifices.

When it is desired to arrange the filters so as to permit their isolation or their suppression, I give to the partitions *p q r s* (see Figs. 6, 7, and 10) the full height of the cylindrical ring of the filter and pierce at the lower part of the partition *p q r s* orifices 1 and 2, respectively, which may be stopped or plugged. In plugging the orifice 2 of the partition *r s* the filter on the right is isolated, by plugging the orifice 1 of the partition *p q* that on the left is isolated, by plugging both the two filters are suppressed and the outflow of water simply decanted is insured by a drain 3, provided in the side of the decanter from *u* to *v*, or by an orifice pierced in this side. (See Figs. 8, 9, and 11.)

Returning to the advantages previously set forth, I would observe:

First. That the ascension of the liquid taking place throughout the case or body of the decanter, of whatever form it may be, the effective speed of the ascent may be lessened at will by increasing the section of the apparatus, without, however, uselessly increasing its volume, because the height of the receiver may be proportionately diminished.

Second. That the principles of circulation are: The circulation in thin sheets and the automatic discharge of the deposits by sliding on the diaphragms inclined and converging toward discharge-orifices, the said principles being insured by a mode of construction which does not necessitate the tightness of the diaphragms.

Third. That this method of construction of the decanter comprises purely and simply the superposition without joints and without rivetings of similar elements in number varying at will. Therefore the deposit-surface may be modified as may be desired by increasing or diminishing the number of the stages, and that almost instantaneously, according to requirement, without any complication.

Fourth. That the evacuation or discharge of the deposits is made by a single orifice placed at the bottom of the decanter.

Accessorily I would observe that the central tube may be made of a single piece or of conduit-pipes comprising several elementary pipes soldered together; that, on the other hand, I may in a same apparatus use pipes of variable heights and different diameters in case it should be desired to vary the distance apart of the diaphragms.

When the filter is placed exteriorly, (and with regard to this it should be observed that this filter need not necessarily be annular, and that I may use one or several isolated distinct filters of any pattern,) it will be observed that there is at the upper part of the decanter a large free conical space simply traversed, in the case shown on the drawings, by the feed-tube of the apparatus. I propose to utilize this conical space to place therein the apparatus for continous preparation of lime-water, which usually completes my decantation apparatus. This apparatus (represented separately by Fig. 3) is composed of a cylindrical vat of the same diameter as the decanter, upon the upper part of which it rests by the aid of a suitably-arranged angle-piece $xx$. A partition $r' r'$ forms in this upper vat a chamber S of a section in form of a segment of a circle, terminating at the bottom in a conical part T, parallel with the last diaphragm, closed near the axis of the decanter by a plane side or wall Z, forming extension of the partition of the upper vat. This receiver with conical bottom constitutes the preparer and the reservoir of lime-water. In the other compartment of the upper vat is formed, by partitioning, a small isolated receiver U, placed above the center of the decanter and joined by the bottom with the feed-tube D of the decanter. The remainder of the upper vat forms the reservoir X of water to be purified, fed by the pump or by the conduit which distributes the water. These several receivers may also be made of pieces distinct from each other instead of forming part of a same vat.

The reservoir of water to be purified is pierced at a certain distance from the bottom with two orifices, one A', Figs. 3 and 12, which places it in communication with the small receiver by a gate-sluice or sump, which may be regulated and arranged in such a manner that the center of the orifice remains at a constant height, (for this purpose it is only necessary to use a gate moved horizontally, or even an ordinary cock,) the other B' placed exactly at the same level, preferably on the outer side, is provided with piping B' C', which traverses a receiver D', containing a provision of lime, which receiver is placed in a suitable position and at a suitable height for facilitating the manipulations, and the outlet $H^2$ is connected at E' to the lower part of the conical receiver, which forms the reservoir of the reagent. The connecting-pipe between the outlet $H^2$ and the inlet E' is cut out of the drawings to indicate that the apparatus D' can be placed at any distance from the filter. The reservoir S is pierced with an outflow-orifice $F^2$, opening also into the little upper receiver exactly at the same height as that which pours the water, and it may be provided on the inside with a pipe having a float permitting taking the clear reagent at the upper part.

The water-reservoir and the reagent-reservoir are two vessels in communication, and consequently the levels of the two liquids are always at the same height therein whatever may be the quantity of water which enters the upper vat. The outflow-orifices being also at the same height, there is thus insured, but in a slightly-different way and with the advantage of a reserve of reagent, the proportionality of the discharges or deliveries which I have already obtained in my anterior apparatus. In order that this result may be quite certain, I give to the portion of the reagent-reservoir which is above the outflow-orifice $F^2$—that is to say, to the utilizable portion—a volume which is, as regards the utilizable portion of the water-reservoir, in relation to the quantity of reagent which must be used to purify the corresponding volumes of water. In these conditions the proportionality is always insured, because when the water ceases to arrive the two upper receivers—water and reagent—continue to empty, while preserving corresponding levels. This arrangement further presents the following great advantage: The preparer of the reagent requires from time to time to be purged of the exhausted deposits. Now, in order that this cleaning may be efficacious, there is generally lost a somewhat important quantity of liquid—that which empties, for example, one-third of the preparer—if this purging is effected during working; or if it is desired to abstain from touching the feed-orifice a certain time elapses before the preparer is filled with liquid, during which time the reagent does not run. I have proved in certain cases where a minimum proportion of reagent was required, that one hour, two hours, or even more, elapsed before the preparer was filled. During this time the water ran out, but was not purified. With the arrangement described above this serious defect disappears, because, as I give to the piping which feeds the preparer of the reagent a somewhat larger diameter, and that, on the other hand, the preparer communicates by this tubing with the water-reservoir, the level of the liquid in the preparer is re-established immediately and instantaneously after the purge. It will be objected that by reason of this momentary affluence the saturation may not be satisfactory; but it is not so, first, because the preparer contains a large reserve of reagent, which mixes with the water flowing in and that in any case a weakened reagent is better than no reagent at all; further, because it is easy to effect the purging or cleaning immediately after the renewal of the lime as to cause the water which re-establishes the level to pass over a great excess of lime, and to thus obtain complete and certain saturation.

To place the provision of lime within reach of the workman on the ground, for example, I use a closed receiver traversed by the liquid to be saturated, and which may be momentarily isolated by means of suitably-placed cocks. To render the working very easy and very rapid I make use of a movable receiver G', of perforated sheet-iron or wire-gauze, in which receiver is placed beforehand the provisions of quicklime in stones or of slaked lime in powder and which is introduced into the closed vessel D', through which passes the water to be saturated, in substitution of a similar receiver exhausted and containing the limestones or stones which may have been in the lime.

In order to prevent any mistake in the operation, as there are two cocks to be worked to isolate the receiver, I arrange the lever $m$ $n$ of the screw, which closes it in such a way that it is not possible to work it without first turning the keys of the cocks H' and H². In a great number of cases lime alone is not sufficient for the purification of the water. The most complicated case is that in which three reagents are required: lime, soda, and salt of aluminium or of iron. It is therefore requisite to complete the above-described arrangement to provide for the distribution of the two other reagents. The solution being identical for both, I limit myself to a single description. The reagent—soda, for example—is placed in a receiver K², placed above the water-vat, for example. It runs off by a flexible tube $h\ j$, fixed at the bottom of the vessel and joined to a small vat with double sides, arranged in such a manner that it may float in the water-reservoir. At the moment of regulating there is poured into the double side such a quantity of water that the level of the liquid in the regulator coincides exactly with the level of the water in the reservoir. Whatever may be the variation of this latter level, that of the regulator with the soda will, therefore, be exactly the same, and the more so as I have previously mentioned that the orifice for overflow of water from the reservoir of water to be purified is pierced at a certain distance from the bottom, which has precisely for object to permit the soda-regulator to descend in the vat to the lower limit, that which corresponds to the stoppage of the outflows. To cause the soda to flow out of the regulator into the small central distributing-receiver, I place against the side of this latter a vertical tube M', closed at the bottom and connected by a siphon or a flexible tube N' with the soda-regulator. The level will always be the same in the intermediate tube as in the regulator, and consequently as in the water-vat. The intermediate tube is pierced with a delivery-orifice O' at the same height as the orifices delivering water and lime-water, and as it is very difficult to regulate a very small delivery by a gate a determined section may be given to this orifice and the concentration of the solution of soda be varied, as required. The floating regulators are guided in their vertical movement by two iron rods $i\ f$ with wheels or rollers $e\ e$. They insure perfect regularity of purification by maintaining levels which always coincide in the several receivers delivering water and the reagents. Finally, the small central receiver, which receives the various deliveries, may be partitioned in case of need to operate the mixing at different instants—for example, if it is advantageous to have the water in connection with the aluminous liquid during a certain time before adding the lime and the soda. This receiver may also be provided with a clack-valve P, closing the feed-orifice of the apparatus. In this case the water-reservoir should be provided with a stop by a float, or otherwise, to arrest the outflow of water when the reservoir is full, and it will be readily seen that at this moment all the outflows will stop because the levels in the several receivers and floating regulators are in coincidence with the level of the central compartment.

A variation in the construction of my decanter consists, Figs. 4 and 5, in giving to the receiver R, which contains the deposit-surfaces, a prismatic form, which alters nothing in its working nor in the advantages of the apparatus. In this case the deposit-surfaces are formed of pyramids the faces E of which are inclined to about forty-five degrees, or from forty degrees to sixty degrees, and formed of pieces, leaving between them the openings K², alternated from one stage to another in order that the circulation of the liquid may be opposed or checked.

I claim as my invention—

1. A decanting apparatus consisting of a receiver provided with superposed removable deposit-surfaces, the said surfaces being inclined toward the center and pierced with alternate openings from the center to the periphery of constant breadth for the upward passage of the water, substantially as and for the purposes set forth.

2. A decanting apparatus consisting of a receiver provided with a central inlet-tube having branches, circular pieces B, provided with orifices and flanges and adapted to be fitted one above the other around the central tube, and deposit-surfaces inclined toward the center and adapted to rest upon the flanges of the pieces B, substantially as and for the purposes set forth.

3. A decanting apparatus consisting of a receiver provided with a central water-supply tube and deposit-surfaces inclined toward the center and pierced with openings, circular pieces around the central tube, the said pieces provided with flanges upon which the deposit-surfaces rest, and with openings, and a mud-cock at the bottom of the receiver, all substantially as set forth.

In testimony whereof I have signed my name to this specification in the presence of two subscribing witnesses.

PAUL HENRI AUGUSTE GAILLET.

Witnesses:
CHARLES PIERRE DÉNIÉ RABOÉNOR,
ERNEST PAUL BOSKER.